(12) United States Patent
Vertriest (10) Patent No.: US 10,589,218 B2
(45) Date of Patent: Mar. 17, 2020

(54) INSTALLATION FOR DRYING COMPRESSED GAS

(71) Applicant: ATLAS COPCO AIRPOWER, NAAMLOZE VENNOOTSCHAP, Wilrijk (BE)

(72) Inventor: Danny Etienne Andree Vertriest, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 127 days.

(21) Appl. No.: 15/572,476

(22) PCT Filed: May 10, 2016

(86) PCT No.: PCT/BE2016/000021
§ 371 (c)(1),
(2) Date: Nov. 7, 2017

(87) PCT Pub. No.: WO2016/179668
PCT Pub. Date: Nov. 17, 2016

(65) Prior Publication Data
US 2018/0104645 A1    Apr. 19, 2018

(30) Foreign Application Priority Data

May 13, 2015 (BE) .................................. 2015/5301

(51) Int. Cl.
*B01D 53/04* (2006.01)
*B01D 53/26* (2006.01)

(52) U.S. Cl.
CPC ....... *B01D 53/261* (2013.01); *B01D 53/0462* (2013.01); *B01D 2259/40003* (2013.01);
(Continued)

(58) Field of Classification Search
CPC .............. B01D 53/0462; B01D 53/261; B01D 2259/40003; B01D 2259/40007; B01D 2259/403; B01D 2259/404
(Continued)

(56) References Cited

U.S. PATENT DOCUMENTS

| 2,629,460 A | * | 2/1953 | Maki ...................... B01D 53/26 137/110 |
| 3,632,504 A | * | 1/1972 | Barrere, Jr. et al. ..... C10G 5/02 208/310 R |

(Continued)

FOREIGN PATENT DOCUMENTS

| CN | 101282778 A | 10/2008 |
| CN | 101479018 A | 7/2009 |

(Continued)

OTHER PUBLICATIONS

International Search Report (ISR) dated Oct. 19, 2016, for PCT/BE2016/000021.

*Primary Examiner* — Frank M Lawrence, Jr.
(74) *Attorney, Agent, or Firm* — Bacon & Thomas, PLLC (57) ABSTRACT

A device for drying compressed gas with an inlet for compressed gas to be dried originating from a compressor and an outlet for dried compressed gas, whereby this device comprises a number of vessels that are filled with a regeneratable drying agent and a controllable valve system that connects the aforementioned inlet and outlet to the aforementioned vessels, wherein the device comprises at least three vessels, whereby the aforementioned valve system is such that at least one vessel is always being regenerated, while the other vessels dry the compressed gas, whereby due to the control of the valve system the vessels are each successively regenerated in turn.

16 Claims, 10 Drawing Sheets

(52) U.S. Cl.
CPC .. *B01D 2259/403* (2013.01); *B01D 2259/404* (2013.01); *B01D 2259/40007* (2013.01)

(58) Field of Classification Search
USPC .... 95/114, 115, 117, 122, 123, 125; 96/121, 96/126–128; 34/80, 472, 473
See application file for complete search history.

(56) References Cited

U.S. PATENT DOCUMENTS

| | | | | |
|---|---|---|---|---|
| 3,778,037 | A * | 12/1973 | Dierbeck | B01F 3/04773 |
| | | | | 261/28 |
| 4,919,695 | A * | 4/1990 | Trepaud | B01D 53/04 |
| | | | | 96/126 |
| 6,457,485 | B2 | 10/2002 | Hill et al. | |
| 2012/0012005 | A1 * | 1/2012 | Burke | B01D 53/0454 |
| | | | | 96/111 |

FOREIGN PATENT DOCUMENTS

| | | |
|---|---|---|
| CN | 203750387 U | 8/2014 |
| DE | 3412173 A1 | 10/1985 |
| EP | 1926542 A1 | 6/2008 |
| WO | 2015039193 A2 | 3/2015 |

\* cited by examiner

INSTALLATION FOR DRYING COMPRESSED GAS

The present invention relates to a device for drying compressed gas.

More specifically, the invention is intended for drying compressed gas that originates from a compressor.

BACKGROUND OF THE INVENTION

Dryers are already known of the type with a rotating drum that is filled with a regeneratable drying agent, whereby due to the rotation of the drum the drying agent alternately goes through a drying zone in which the drying agent is used to dry compressed gas, and a regeneration zone in which the drying agent is regenerated by bringing it into contact with a hot gas.

Regeneration here means the process by which a drying agent saturated or almost saturated with moisture is stripped of the absorbed or adsorbed moisture by bringing it into contact with a regeneration gas that will remove the moisture from the drying agent. The drying agent will then be able to be used again for drying.

Because the drum rotates, a regenerated drying agent will come into the drying zone and a saturated drying agent into the regeneration zone.

A disadvantage of such a dryer is that the separation between the different zones is not guaranteed and that leaks occur, such that it is possible that regeneration gas leaks to the dried gas.

Dryers of the type with two separate vessels are already known, whereby the vessels are each alternately operated to dry compressed gas and to be regenerated.

By using a suitable system of pipes and valves the two vessels can be switched over.

A disadvantage of such a device is that the slowest process, i.e. in most cases the saturation of the drying agent by drying, will determine the operation and efficiency of the dryer.

An additional disadvantage of both aforementioned known dryers is the fact that fixed volumes are used for the drying and regeneration zones, which cannot be adjusted according to what is required by the situation or circumstances.

SUMMARY OF THE INVENTION

The purpose of the present invention is to provide a solution to at least one of the aforementioned and other disadvantages.

The subject of the present invention is a device for drying compressed gas with an inlet for compressed gas to be dried originating from a compressor and an outlet for dried compressed gas, whereby this device comprises a number of vessels that are filled with a regeneratable drying agent and a controllable valve system that connects the aforementioned inlet and outlet to the aforementioned vessels, whereby the device comprises at least three vessels, whereby the aforementioned valve system is such that at least one vessel is always being regenerated, while the other vessels dry the compressed gas, whereby due to the control of the valve system the vessels are each successively regenerated in turn, whereby the device is provided with a split-off line that splits off a proportion of the dried compressed gas for the regeneration of the aforementioned at least one vessel that is regenerated, whereby this split-off line is provided with a heating element for heating the split-off gas, and whereby the vessels are cooled before or after they are regenerated, whereby by controlling the valve system each vessel successively either:

dries, is regenerated and is cooled; or
dries, is cooled and is regenerated;

whereby the valve system is such that one vessel is always being cooled, while at least one vessel is being regenerated and at least two other vessels dry the compressed gas.

The regeneratable drying agent or desiccant material can be silica gel for example, but another regeneratable drying agent also belongs to the possibilities of the invention.

By driving the gas to be dried through or along the drying agent, the moisture present will be adsorbed or absorbed by the drying agent and removed from the gas.

'Valve system' here generally means a network of pipes and connections with shutoff valves or valves that can be adjusted. It is clear that this valve system can take on many different forms.

An advantage is that by making use of different separate vessels that can act as a drying zone and regeneration zone, no leaks can occur whereby regeneration gas leaks to the dried gas for example.

Another advantage is that a number of vessels can dry simultaneously, so that each vessel will dry for a longer time and will be regenerated for a shorter time.

As the regeneration will proceed more quickly, this will foster the efficiency of the process. Indeed, in this way the regeneration process and the drying process will be better attuned to one another so that when the regeneration of one vessel has been done, another vessel will be fully saturated.

An additional advantage is that when a number of vessels are used, for example six, eight or more, the number of vessels that are regenerated and the number of vessels that dry can be selected on the basis of external parameters, such as the humidity or the temperature of the air to be dried or environmental parameters.

Moreover, it is possible to temporarily shut off or disconnect one or more vessels from the device so that maintenance, repair or replacement of the vessel concerned or the drying agent is possible without the entire device having to be stopped for this purpose.

According to the invention, the regeneration of the vessel can be done by means of a regeneration gas that is tapped off from the compressed gas, after it has been dried or otherwise. It is also possible that a separate circuit with regeneration gas is also used for the regeneration.

Preferably the compressed gas originating from the compressor is first driven to a cooler before it is driven to the vessels that dry, whereby the cooler can form part of the device or the aforementioned compressor.

This has the advantage that a cool gas will be dried better. Moreover, the drying agent will remain cooler, such that it will be able to absorb or adsorb moisture from the gas better.

According to the invention the vessels are cooled before or after being regenerated, whereby by controlling the valve system each vessel successively either:

dries, is regenerated and cooled; or
dries, is cooled and is regenerated;

whereby the valve system is such that one vessel is always being cooled, while at least one vessel is being regenerated and at least two other vessels dry the compressed gas.

As a cool drying agent can absorb or adsorb moisture better, this will foster the efficiency of the device.

Although the cooling of a vessel before or after the regeneration of it can be done, the cooling is preferably done after the regeneration.

The invention also concerns a compressor installation provided with a compressor with an inlet for gas to be compressed and an outlet with a pressure pipe for compressed gas, whereby the compressor installation is provided with a device according to the invention for drying the flow of compressed gas supplied by the compressor that is guided through the device for the supply of dried gas to a consumer network via the outlet of the device, whereby to this end the pressure pipe connects to the inlet of the device.

Such a compressor installation will have the corresponding advantages of a device according to the invention.

BRIEF DESCRIPTION OF THE DRAWINGS

With the intention of better showing the characteristics of the invention, a few preferred variants of a device and compressor installation are described hereinafter by way of an example, without any limiting nature, with reference to the accompanying drawings, wherein.

DETAILED DESCRIPTION OF THE INVENTION

Figure 1:
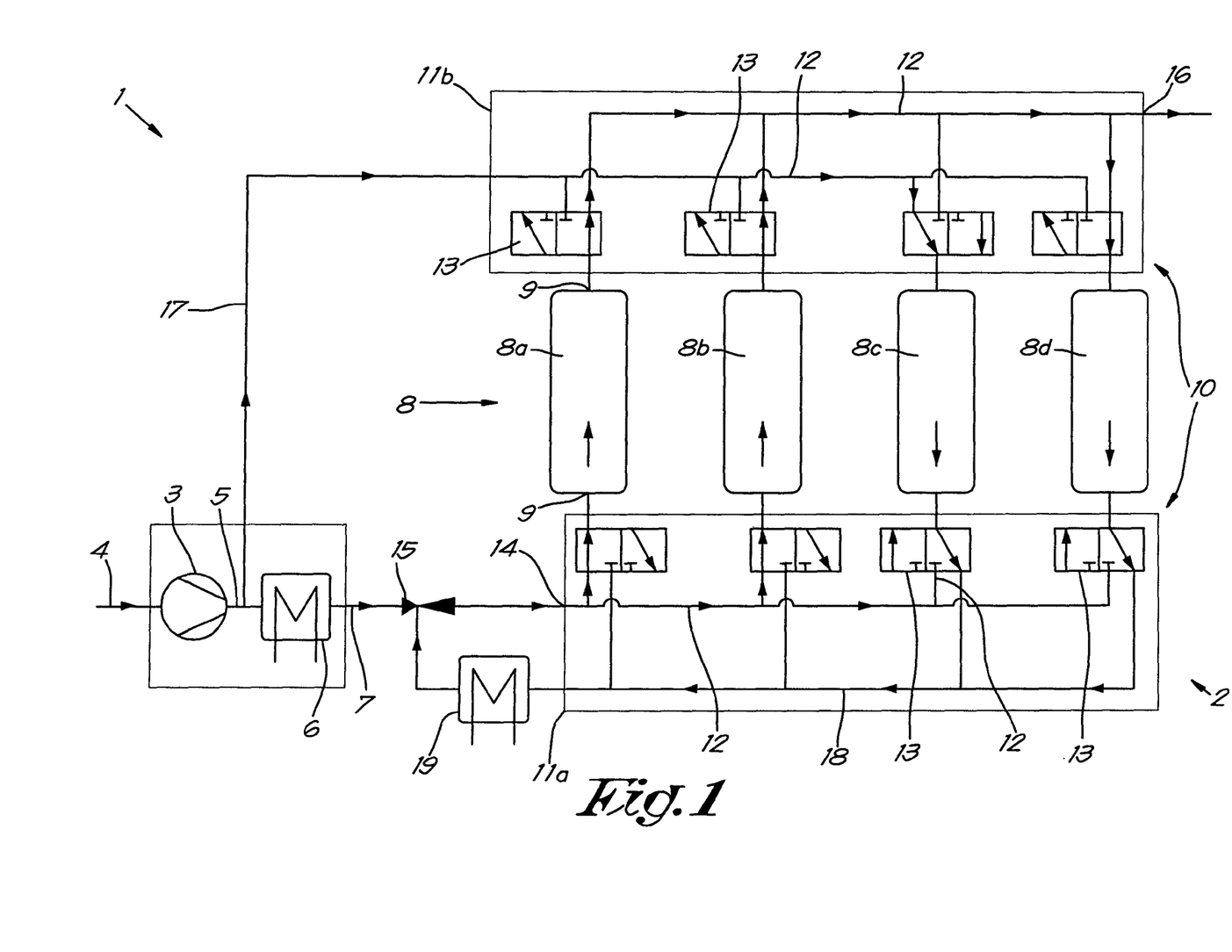
FIGS. 1 to 10 schematically show a number of variants of a device for drying compressed gas and a compressor installation provided with such a device.

FIG. 1 schematically shows a compressor device 1, that is provided with a device 2 for drying compressed gas originating from the compressor device 1.

The compressor device 1 further comprises a compressor 3 with an inlet 4 for gas to be compressed and an outlet 5 with a pressure pipe for compressed gas.

Downstream from the compressor 3 a cooler 6 is affixed for cooling the compressed gas before it is driven to the device 2.

It is not excluded that the cooler 6 forms part of the device 2 instead of forming part of the compressor device 1.

The outlet 7 of the cooler 6 is connected to the device 2.

The device 2 further comprises a number of vessels 8, in this case four vessels 8a-d. It is clear that it is not excluded that the device comprises three, five, six, seven, eight or even more vessels 8.

In this case two vessels 8a, 8b will dry, while one vessel 8d will be cooled and one vessel 8c will be regenerated.

However, this is not necessarily always the case. The number of vessels 8 that dry, are cooled and regenerated can vary over time. For example, when the regeneration proceeds more quickly than the drying or when the cooling of the vessel 8d has been completed, this vessel 8d can begin to dry.

The vessels 8 are filled with a regeneratable drying agent, such as silica gel for example. The drying agent will be able to absorb or adsorb moisture, for example water or water vapour, from a moist gas that is guided through the vessels 8.

The vessels 8 are preferably formed by extruded profiles. As can be seen in the drawing, the vessels have two connections 9 for the supply and removal of gas, whereby the connections 9 are located at the opposite ends of the profile. In this way, the gas must travel a long way through the vessel 8 and thus through the drying agent.

The device 2 is provided with a controllable valve system 10, which in this example is constructed in the form of one or more blocks 11a, 11b that are connected to the vessels 8, which consist of a network of pipes 12 with valves 13 or shutoff valves.

In this case there are two blocks 11a, 11b that are as good as identical and which are connected to the opposite ends of the vessels 8.

The controllable valve system 10 is constructed such that it will be possible to control this valve system 10 such that one vessel 8c is regenerated, one vessel 8d is cooled and two vessels 8a, 8b will dry, for example by the suitable switching of the valves 13.

In the example shown this is made possible because the valves 13 are switchable between two different states. To this end the device 2 is provided with a control unit, not shown in the drawings.

The device 2 is provided with an inlet 14 for compressed gas to be dried at the location of the block 11a, that connects to the outlet 7 of the aforementioned cooler 6 by means of an injector 15.

Furthermore, the device is provided with an outlet 16 for dried compressed gas at the location of the other block.

The device 2 is also provided with a branch off line 17 that taps off a proportion of the hot compressed gas to be dried originating from the compressor 3 before the gas is driven through the cooler, whereby the tapped-off gas is driven via the branch off line 17 to one of the vessels 8c in order to regenerate this vessel.

Because this gas is relatively hot, it will be able to efficiently regenerate the vessel 8c by extracting the absorbed or adsorbed moisture from the drying agent and removing it.

This gas will then be driven via a feedback line 18 to a cooler 19 and then to the aforementioned injector 15. In this case, this feedback line 18 is integrated in the block 11a. It is also possible that this gas is vented out instead of being driven to one of the aforementioned vessels 8 again.

The device 2, more specifically the blocks, 11a, 11b are also constructed such that a proportion of the dried compressed gas can be split off before this gas leaves the device 2 via the outlet 16.

In the example shown, this is done by the operation of the valves 13 in the block 11b and the pipes 12.

This split-off gas will be guided to the vessel 8d that must be cooled, after which it is driven to the cooler 19 via the aforementioned feedback line 18 and then to the aforementioned injector 15. It is not excluded that this gas is then vented out instead of being driven to the cooler 19 and injector 15.

The cooler 19 is optional.

The operation of the compressor device 1 is very simple and as follows.

The compressor 3 will draw in gas to be compressed via its inlet 4, whereby this gas may contain a quantity of moisture. The compressed gas will leave the compressor 3 via the outlet 5 of the compressor 3.

As the gas will heat up during compression, the compressed gas will be at a higher temperature.

Hence it is driven via the cooler 6, whereby it is not excluded that a proportion of the moisture condenses and is removed via a condensate separator.

Then the cooled compressed gas is brought to the inlet 14 of the device, where it is guided to the vessels 8 via the injector 15.

Hereby the valves 13 in the block 11a are controlled such that the gas can only get into the vessels 8a, 8b that dry.

During the passage in these vessels 8a, 8b the gas comes into close contact with the drying agent, such that the moisture in this gas will be absorbed or adsorbed by the drying agent.

The dried compressed gas will leave the vessels 8a, 8b and flow via the pipes 12 and valves 13 of the block 11b to the outlet 16 in order to be removed to a consumer network for example, that is not shown in the drawings.

Simultaneously with the drying process that takes place in the two aforementioned vessels 8a, 8b there will also be one vessel 8c that is regenerated, whereby this vessel will contain a saturated or almost saturated drying agent. This vessel will have previously dried gas.

In order to regenerate this vessel 8c, use is made of a regeneration gas whereby in this case this gas is tapped off at the outlet 5 of the compressor by means of the branch off line 17.

This branch off line 17 will tap off a proportion of the hot compressed gas and guide it to the block 11b, where the pipes 12 and valves 13 ensure that it is guided to the vessel 8c that must be regenerated.

This tapped-off gas will flow through this vessel 8c, whereby, by making use of the heat of compression, the absorbed or adsorbed moisture is removed and the drying agent is thus dried.

After its passage through the vessel 8c, the gas is driven to the cooler 19 via the feedback line 18 of the block 11a and is combined with the cooled compressed gas originating from the compressor 3 by means of the injector 15.

Then it will be driven to the vessels 8a, 8b that dry and take the same path as described above.

In other words: the gas is recycled.

In this case, but not necessary for the invention, the fourth vessel 8d will be cooled simultaneously with the drying process and the regeneration process. This vessel 8d will have previously been regenerated with the hot regeneration gas.

As a result, the regenerated drying agent will be at a relatively high temperature.

As a cold drying agent can dry better than a hot drying agent, it is better for the efficiency of the device 2 to first cool the drying agent before deploying the vessel 8d concerned for drying again.

The cooling will be done by means of a cooling gas, whereby in this case it is a cool, dry compressed gas that is split off at the outlet 16.

The pipes 12 and valves 13 of the block 11b will ensure that this split-off gas is guided to the vessel 8d that must be cooled.

The split-off gas will flow through this vessel 8d, whereby this gas will cool the drying agent. After its passage through the vessel 8d the gas is driven through the block 11b via the feedback line 18 to the cooler 19 and combined with the cooled compressed gas originating from the compressor 3 by means of the injector 15.

In other words: in this case the cooling gas is recycled, analogous to the regeneration gas.

When one of the vessels 8a or 8b that dry gas are saturated with moisture, it will be necessary to regenerate this vessel, for example vessel 8a.

By switching the valves 13 over it can be ensured that regeneration gas is brought to this vessel 8a by opening the connection of this vessel 8a to the branch off line 17 and the feedback line 18, such that the regeneration can be done according to the process described above.

The other vessel 8b that previously dried gas will not yet be saturated and will still be used to dry gas.

The vessel 8c that was previously regenerated will now be cooled. This is done analogously by the suitable switching of the valves 13 so that the cooling gas is guided to this vessel 8c.

Also in an analogous way the vessel 8d that was previously cooled is now deployed to dry compressed gas.

The switch-over cycle described above will be continuously repeated so that each vessel 8 will successively dry, then be regenerated to then be cooled after which it can be used to dry gas again.

It is important to note that the control of the valves 13 can be adjusted according to the operating parameters and/or the loading level of the device 2 in order to optimise the process.

For example, on the basis of the moistness of the compressed gas that leaves the compressor 3.

It is clear that this control can be done automatically, for example by providing the necessary sensors and controllers.

Although the vessels 8 as described above are cooled after regeneration, it is not excluded that the vessels 8 are first cooled before being regenerated.

Figure 2:
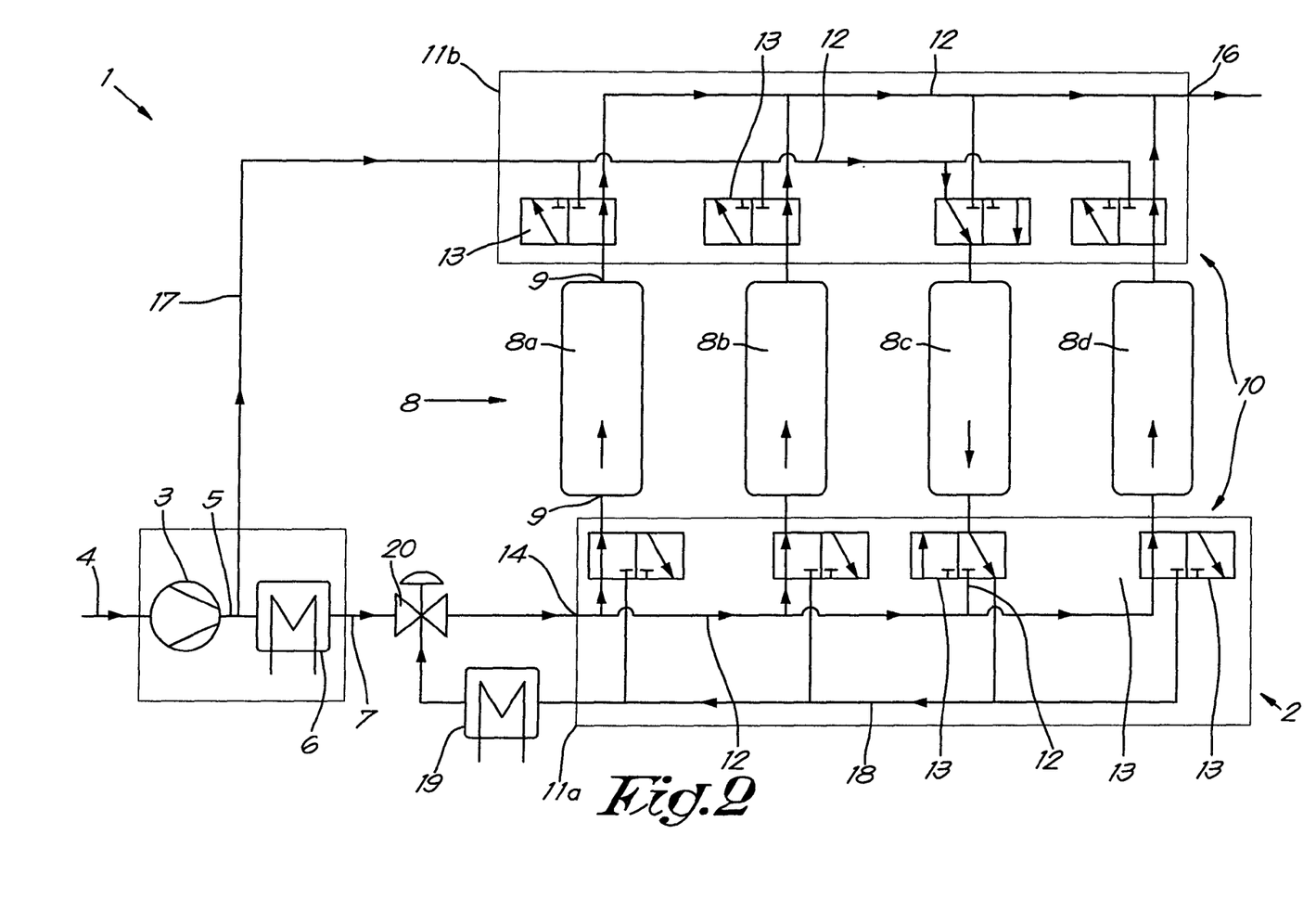

FIG. 2 shows an alternative embodiment of a compressor device 1.

The difference with the previous embodiment is that the injector 15 is replaced by a valve 20 that will control the split flow. In this case, the valve 20 is constructed as a three-way valve that will control the ratio between the split partial flows. It is possible that this valve 20 is automatically controllable using the aforementioned control or another control.

The cooling will also be done in a different way. In this case use is made of a part of the gas to be dried that is tapped off after the gas is driven via any cooler 6. This tapped-off gas will be used to cool the vessel 8d, after which this tapped-off gas is guided to the outlet 16 for dried compressed gas.

For the rest, the compressor device 1 and its operation is analogous to the embodiment described above.

Figure 3:
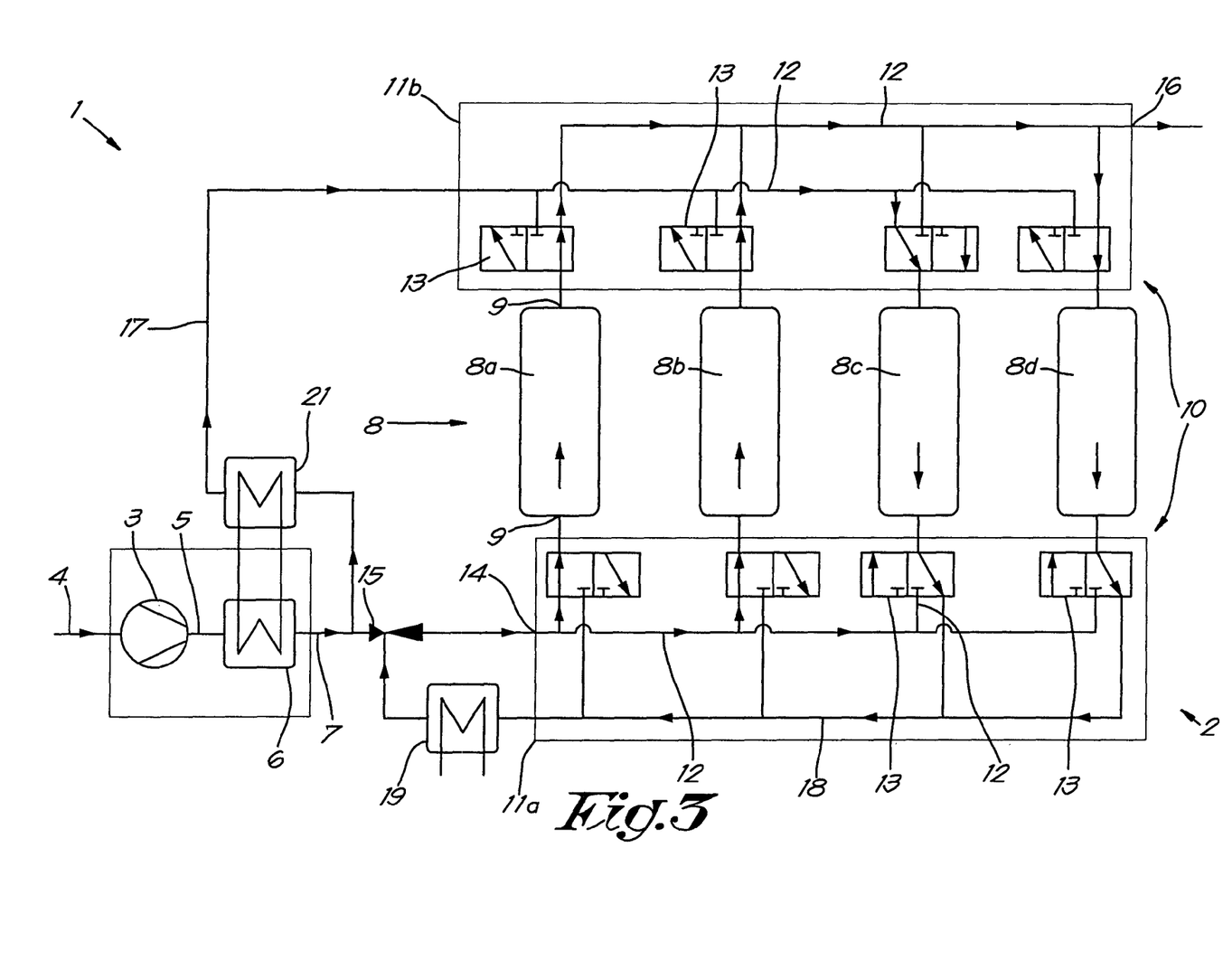

FIG. 3 shows another alternative embodiment that is approximately the same as the first embodiment, but whereby in this case the branch off line 17 will tap off gas after the compressed gas has passed through the cooler 6. A heat exchanger 21 is incorporated in the branch off line 17 that is coupled to the aforementioned cooler 6 in order to heat the gas again by means of the heat extracted from the compressed gas.

Figure 4:
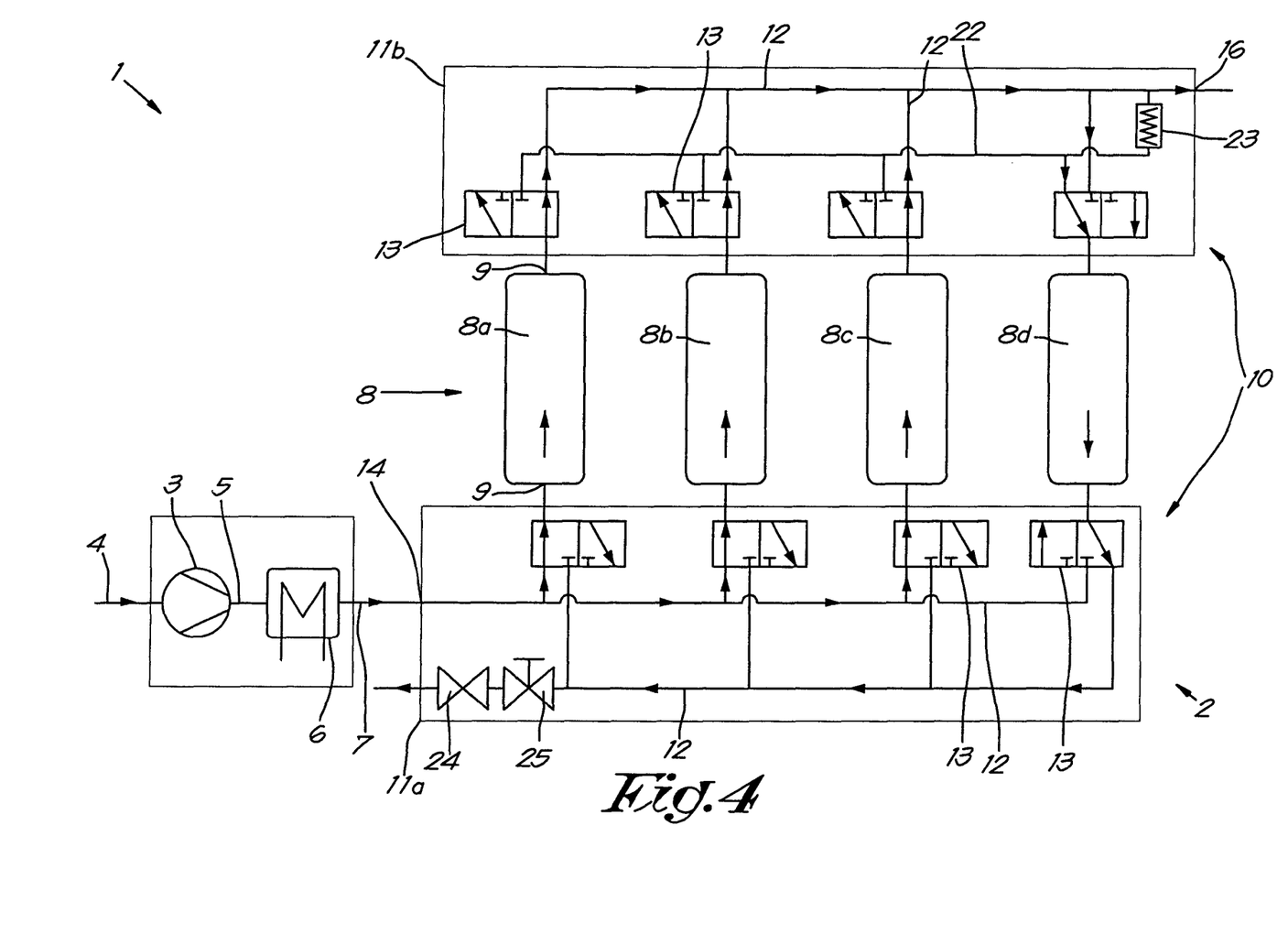

FIG. 4 shows an embodiment of a device and a compressor installation according to the invention, whereby in this case three vessels 8a, 8b, 8c will dry at all times and one vessel 8d will be regenerated. In other words, there is no separate vessel 8 for cooling.

According to the invention, the regeneration gas is split off from the dried compressed gas by means of a split-off line 22 before it leaves the device 2 via the outlet 16.

As the dried compressed gas is cooled in the cooler 6, it will be necessary to provide a heating element 23 in this split-off line 22 that will heat the split-off gas before being driven to the vessel 8d to be regenerated.

In this case, but not necessarily, this split-off line 22 and the heating element 23 are both integrated in the block 11b.

The split-off gas can be brought to such a temperature by the heating element 23 that it is hot enough to be able to regenerate the drying agent.

After this regeneration phase of the vessel 8d, the cooling of the vessel 8d can be obtained by switching off the heating element 23 for some time so that the split-off gas is not heated before being guided to the vessel 8d.

The split-off gas will then act as a cooling gas as it were, so that the cooling of the vessel 8d is obtained, before it is used for drying gas.

The heating element 23 can remain switched on for fifty minutes for example, to ensure the regeneration of the vessel

8*d* and then be switched off for ten minutes so that the split-off gas can cool the vessel 8*d*.

In certain cases, depending on the temperature, operating conditions and requested pressure dew point, it is possible to bring the split-off gas to such a temperature by means of the heating element 23 that it is just hot enough to be able to regenerate the drying agent, but no hotter. In this way it can be ensured that cooling of the vessel 8*d* is not required after regeneration and/or that the heating element 23 must be temporarily switched off.

After passing through the vessel 8*d*, the split-off gas is vented out by means of a venting valve 24. In other words this gas will not be recycled.

An expansion valve 25 is provided just upstream from the venting valve 24. This expansion valve can also be provided just upstream from the heating element 23 in the split-off line 22.

It is clear that the split-off line 22 can also be used in some of the other embodiments described here, instead of or in addition to the branch off line 17.

Figure 5:
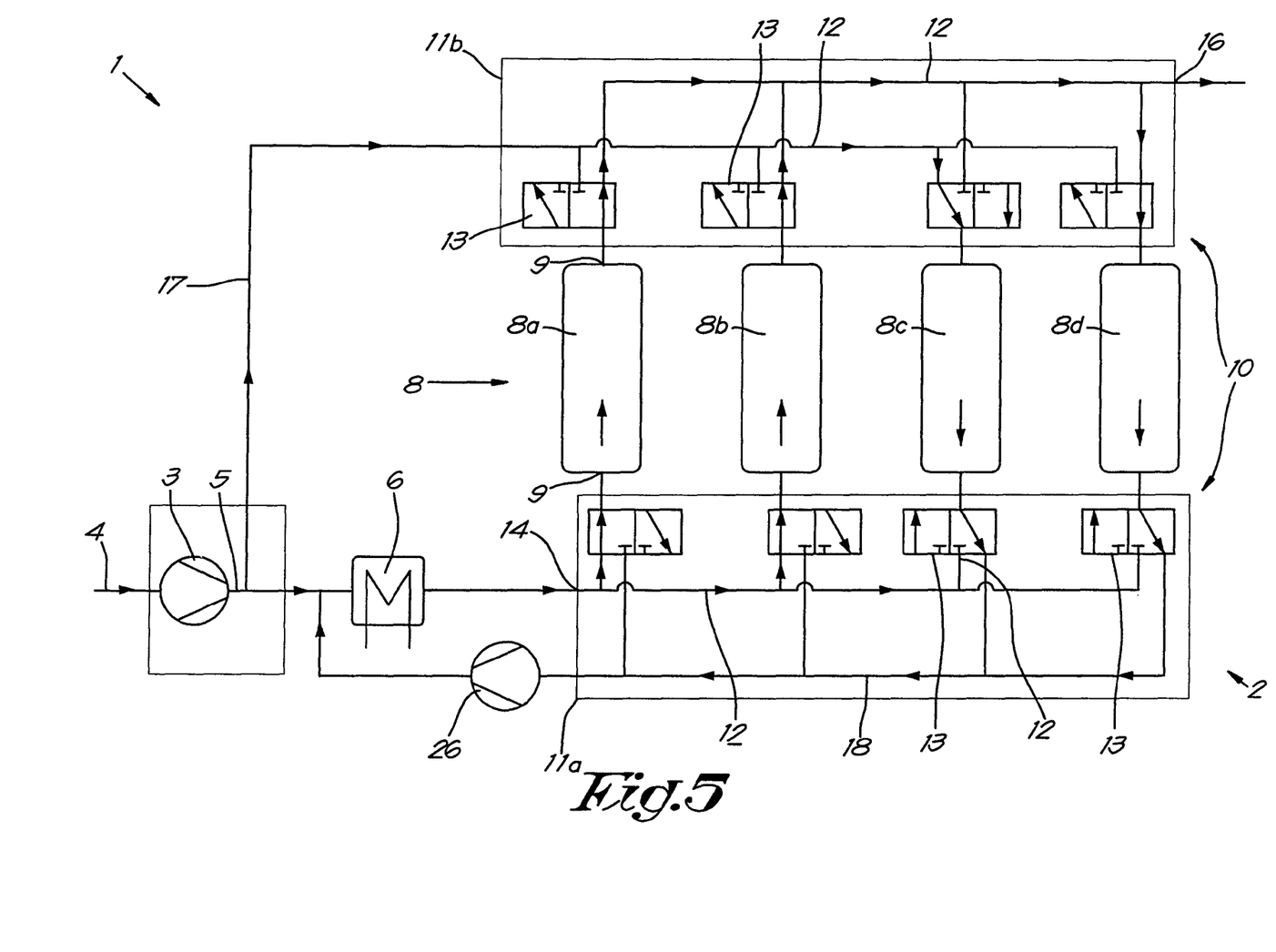

FIG. 5 shows an alternative embodiment that is the same as the compressor installation 1 of FIG. 1, but whereby in this case the injector 15 is omitted.

Instead of this the cooler 19 is replaced by a booster blower 26.

The booster blower 26 will ensure that the cooling gas and the regeneration gas is driven back to the inlet 14 via the feedback line 18.

A booster blower 26 means pressure-increasing means such as a screw blower, a centrifugal blower, a compressor and toothed or rotor blower or similar, for example.

The cooler 6 is moved so that it is just upstream from the inlet 14 of the device 2, so that this cooler can cool the gas originating from the compressor 3 and the cooling gas and the regeneration gas that flow back via the feedback line 18 due to the action of the booster blower 26.

Figure 6:
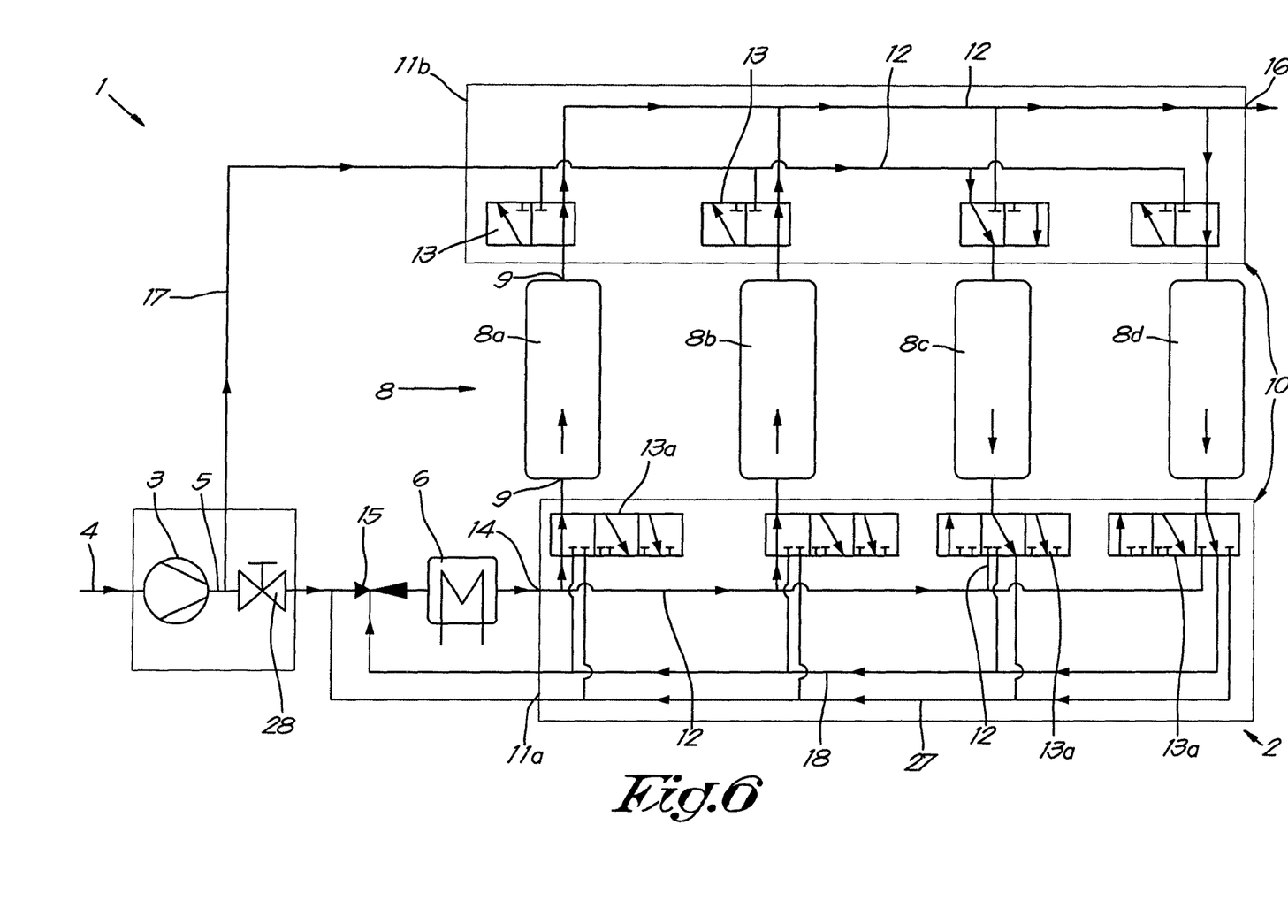

FIG. 6 shows another alternative embodiment that differs from FIG. 1 in that the cooler 9 is absent and whereby the cooler 6 is moved to a location downstream from the injector 15 and upstream from the inlet 14.

Furthermore, the block 11*a* is constructed differently whereby the valves 13*a* are switchable between three states.

The valve 13 can connect the connection of a vessel 8 to either the inlet 14 for the supply of gas to be dried, so that the vessel 8*a* or 8*b* concerned can dry the gas, or to the feedback line 18 for feeding back the cooling gas when it has cooled the vessel 8*d* concerned, or to a return line for returning the regeneration gas when the vessel 8*c* concerned is regenerated.

The return line 27 will return the regeneration gas to a point upstream from the injector 15.

In this case a separate pipe is provided to return the regeneration gas and the cooling gas to the inlet 14.

At the location where the cooler 6 was previously located, a control valve 28 is now affixed, which in this case takes on the form of a two-way valve, after which the aforementioned injector 15 and the cooler 6 are successively placed. The control valve 28 has the same function as the valve 20 and will be able to control the split-flow, or thus how much of the compressed gas originating from the compressor 3 is split off by the split-off line 17. This control valve 28, analogous to the valve 20, can be automatically controlled by means of the aforementioned control or another control.

Figure 7:
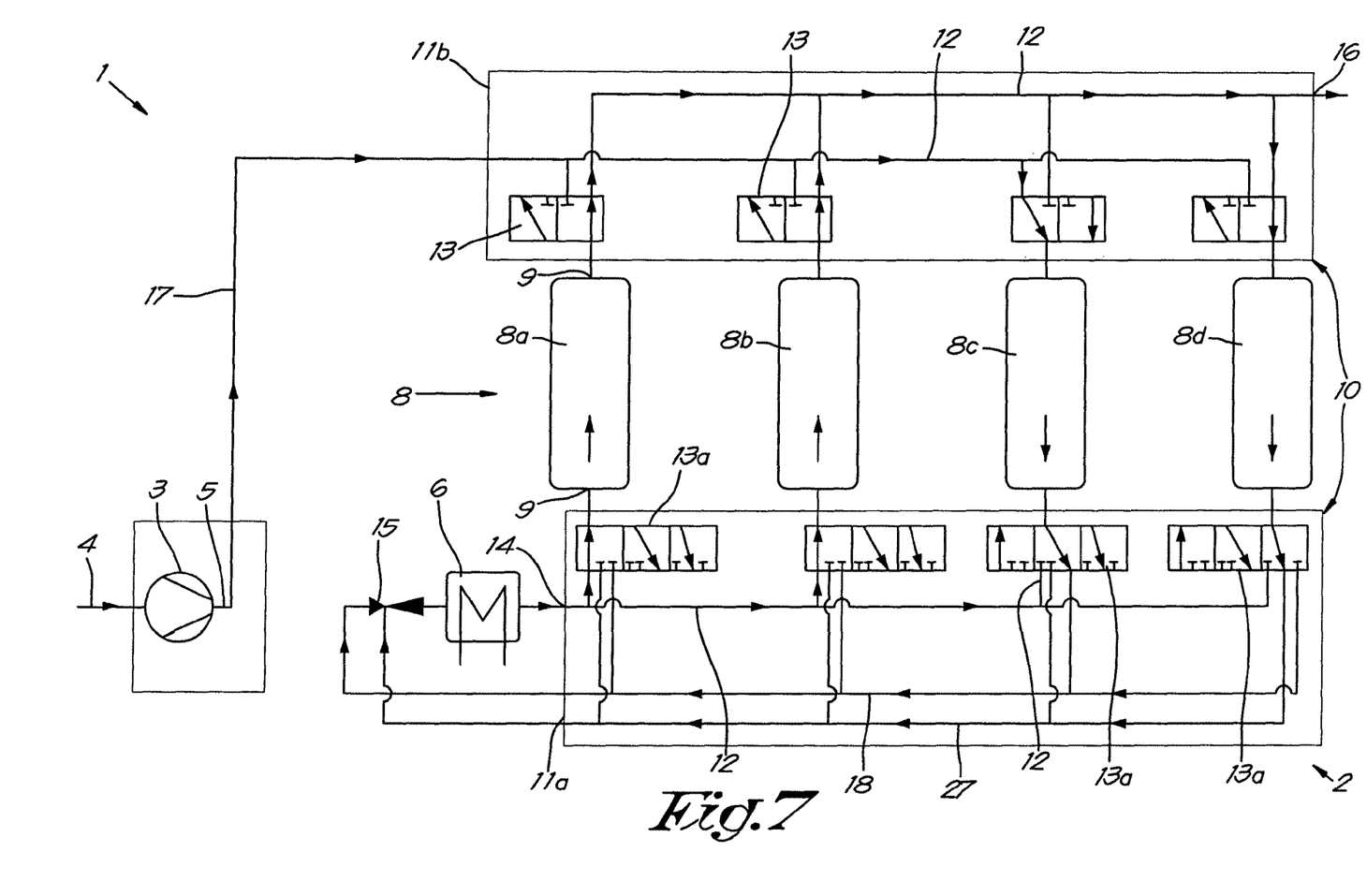

FIG. 7 shows a variant according to the 'full flow regeneration', whereby the entire flow of the compressor 3 is guided to the vessel 8*c* to be regenerated.

Hereby the cooler 6 of FIG. 1 is moved to a location downstream from the injector 15, so that the heat of compression can be used for the regeneration.

The block 11*b* is constructed as in FIG. 6, with valves 13*a* with three states, whereby in this case a return line 27 is also provided, as in FIG. 6, so that the cooling gas and the regeneration gas can be guided via a separate pipe to the inlet 14.

The feedback line 18 for the regeneration gas and the return line 27 for the cooling gas both lead to the injector 15, from where the cooling gas and regeneration gas are guided to the cooler 6 before being guided to the vessels 8*a* and 8*b*.

Figure 8:
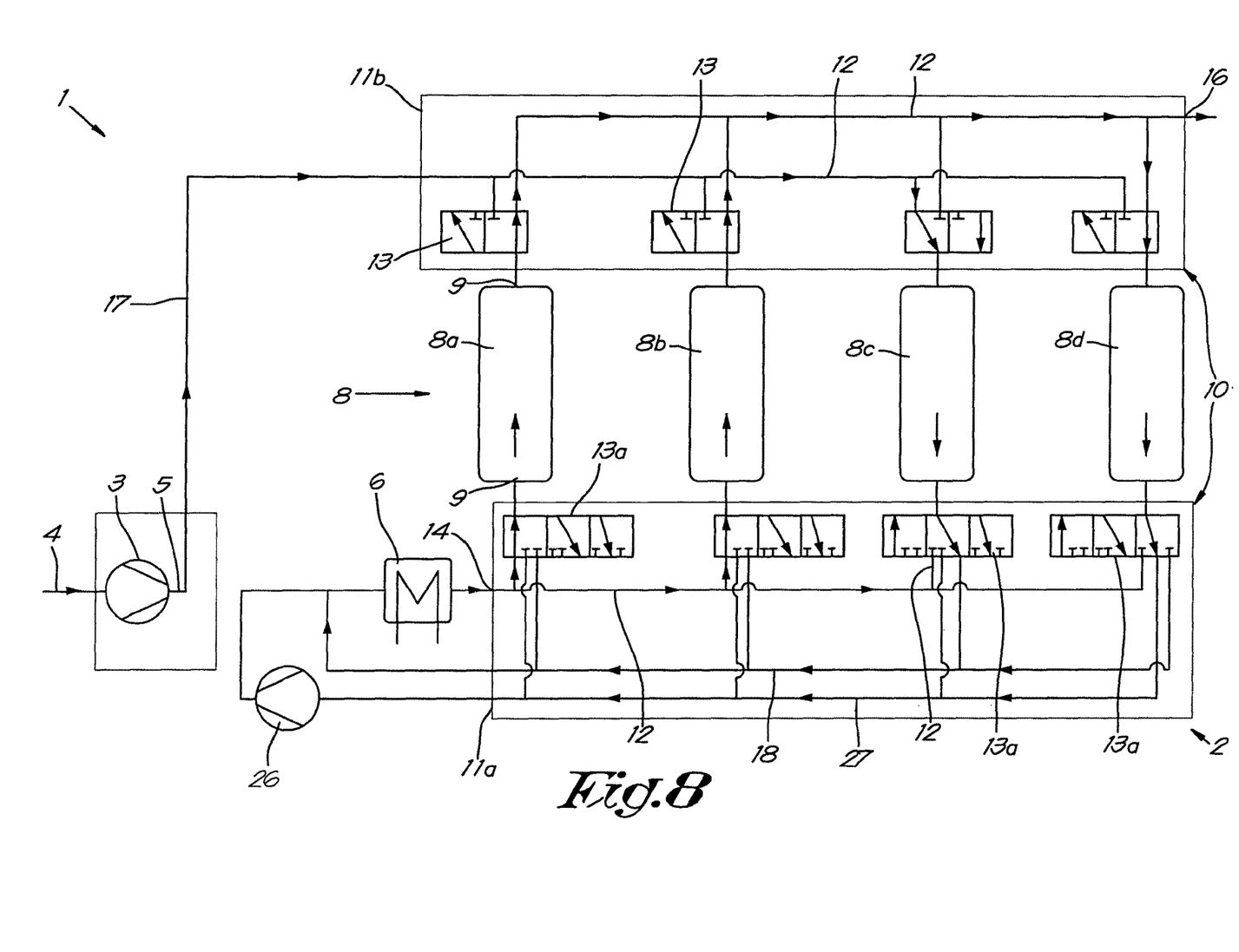

The compressor device 1 as shown in FIG. 8 is analogous to the compressor device 1 of FIG. 7, only that a booster blower 26 is affixed in the return line 27 to ensure that the cooling gas can be guided to the cooler 6 via the return line 27. The use of the booster blower 26 makes the injector 15 superfluous.

Figure 9:
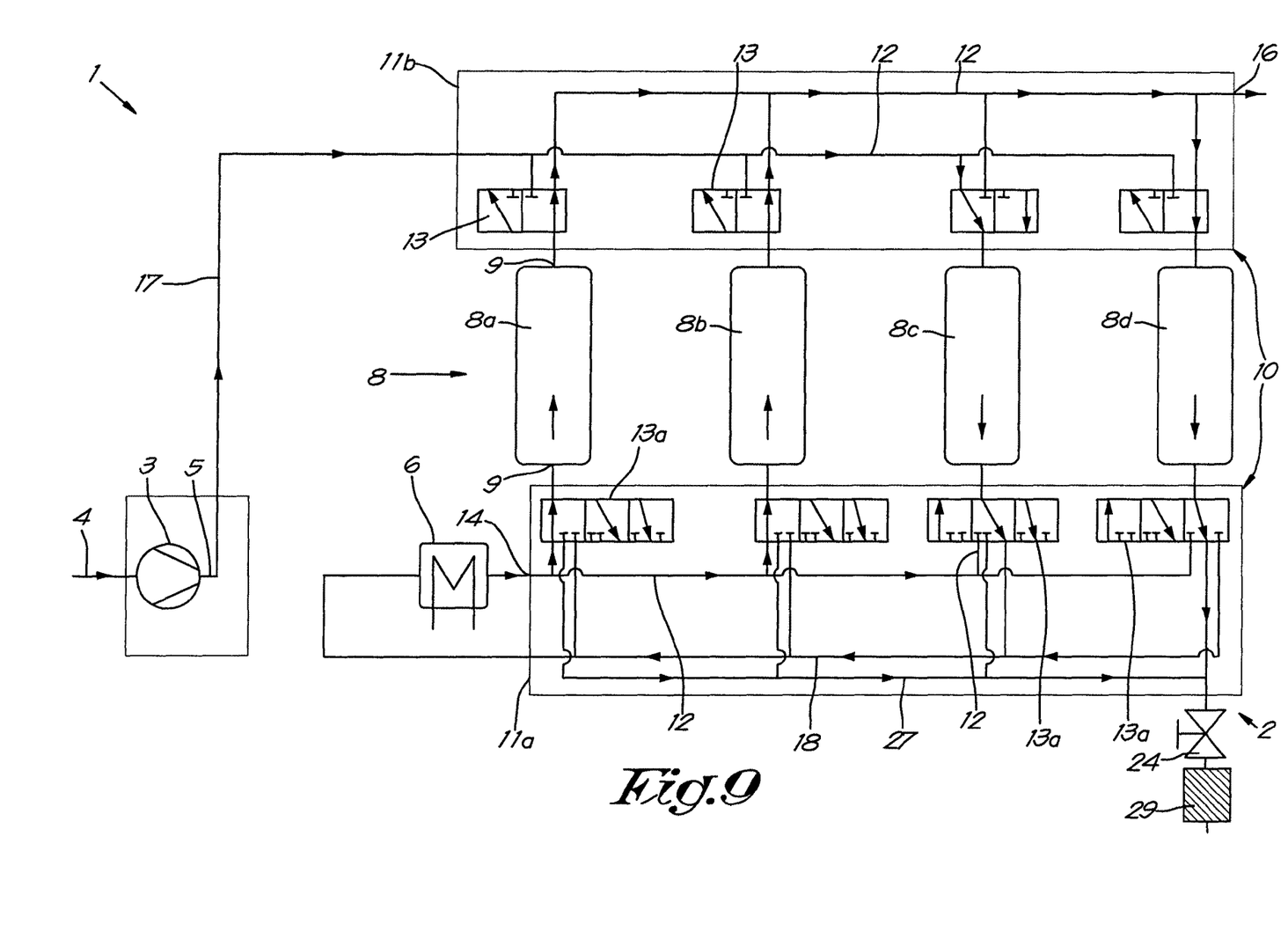

FIG. 9 shows an alternative for FIG. 7. In this case the return line 27 is absent, but the cooling gas will be vented out.

To this end the compressor device 1 is provided with a venting valve 24 and a sound damper 29. The injector 15 is omitted.

Figure 10:
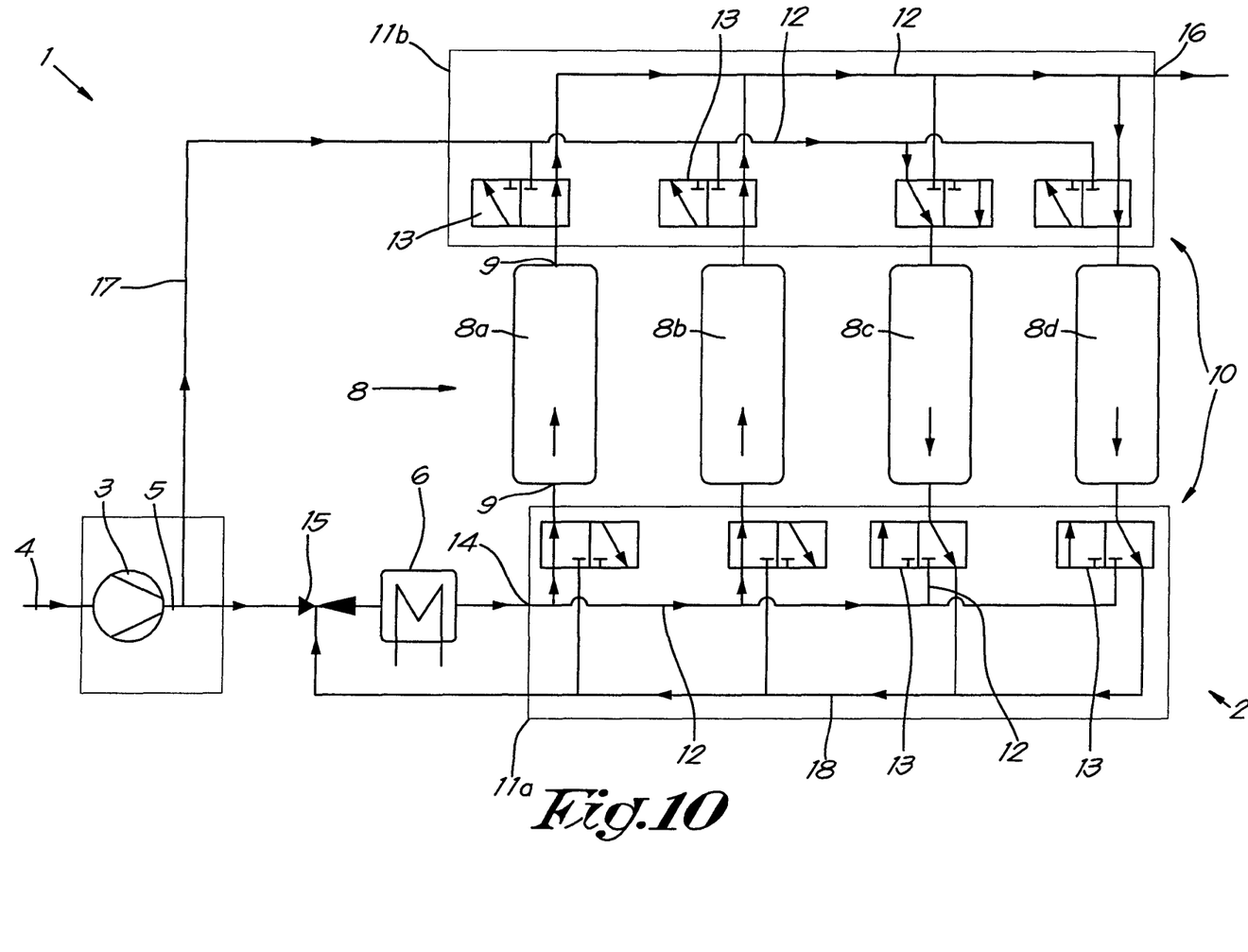

A last variant shown in FIG. 10, differs from the variant of FIG. 1, by the cooler 19 being absent and by the cooler 6 being moved. This has the advantage that one cooler 19 can be spared.

Although in the examples shown above, the gas that is used for the regeneration is tapped off or split off from the compressed gas, it is not excluded that the device 2 according to the invention is provided with a separate circuit with a regeneration gas for the regeneration of the aforementioned at least one vessel 8 that is regenerated.

This has the advantage that the type of gas, the temperature, moistness and other parameters of this gas can be chosen to be as optimum as possible in order to obtain a good regeneration.

The examples shown only show a few conceivable combinations regarding the origin of the cooling gas and regeneration gas. It is clear that even more combinations are possible that all come within the scope of the invention.

The examples shown always show four vessels 8*a*-8*d* but it is not excluded that there are only three vessels 8 or more than four vessels 8.

Although a preferred embodiment comprises four vessels 8, of which one vessel 8 is cooled, one vessel 8 is regenerated and two vessels 8 dry, other combinations are also possible.

For example it is possible that the number of vessels 8 that dry, are regenerated and cooled is variable over time, depending on the speed of the regeneration and the cooling of the vessels 8.

Furthermore, it is also possible that there are six vessels 8, of which one vessel 8 is always being cooled, two vessels 8 are always being regenerated, and three vessels are always drying.

It is also possible that there are eight vessels 8, of which one vessel 8 is always being cooled, at least two vessels 8 are always being regenerated and at least four vessels 8 are always drying.

The eighth vessel 8 can then be switched according to choice as a vessel 8 that is regenerated, or as a vessel that will dry gas depending on what is required at that time.

This is another additional advantage of the invention: in all examples shown it can always be chosen how many vessels 8 always have to be regenerated and/or have to be cooled and how many vessels 8 always have to dry.

The present invention is by no means limited to the embodiments described as an example and shown in the drawings, but such a device and compressor installation according to the invention can be realised according to different variants, without departing from the scope of the invention.

The invention claimed is:

1. A device for drying compressed gas with an inlet for compressed gas to be dried originating from a compressor and an outlet for dried compressed gas, wherein said device comprises at least four vessels that are filled with a regeneratable drying agent and a controllable valve system that connects the inlet and the outlet to the at least four vessels,
   wherein the valve system is configured in a way such that at least one vessel of the at least four vessels is always being regenerated, while at least two of vessels of the at least four vessels dry the compressed gas, wherein due to the control of the valve system the at least four vessels are each successively regenerated in turn,
   wherein the device is provided with a split-off line that splits off a proportion of the dried compressed gas for the regeneration of the at least one vessel that is regenerated, wherein said split-off line is provided with a heating element for heating the split-off gas, and wherein the at least four vessels are configured to be cooled before or after the at least four vessels are regenerated, and
   wherein the valve system is configured so that each vessel is successively either:
      used to dry the compressed gas, regenerated and cooled; or
      used to dry the compressed gas, cooled and regenerated;
   wherein the valve system is configured such that one vessel is always cooled, while the at least one vessel is regenerated and the at least two other vessels dry the compressed gas.

2. The device according to claim 1, wherein the compressed gas originating from the compressor is first driven to a cooler before being driven to the at least two vessels that dry, wherein the cooler is formed as part of the device or the aforementioned compressor.

3. A device for drying compressed gas with an inlet for compressed gas to be dried originating from a compressor and an outlet for dried compressed gas, said device comprising:
   at least three vessels that are filled with a regeneratable drying agent; and
   a controllable valve system that connects the inlet and the outlet to the at least three vessels,
   wherein the controllable valve system is configured in a way such that at least one first vessel of the at least three vessels is always being regenerated, while at least one second vessel of the at least three vessels dries the compressed gas, and at least one third vessel of the at least three vessels is always cooled, wherein due to the control of the valve system the at least three vessels are each successively regenerated in turn,
   wherein the device is provided with a branch off line that taps off at least a proportion of the compressed gas to be dried originating from the compressor before the gas is driven via any cooler, wherein the tapped-off gas is used for the regeneration of the at least one vessel that is regenerated,
   wherein the valve system is configured so that each vessel is successively either:
      used to dry the compressed gas, regenerated and cooled; or
      used to dry the compressed gas, cooled and regenerated.

4. The device according to claim 3, wherein the gas that is used for the regeneration of the aforementioned at least one vessel that is regenerated, is then driven to the at least one vessel that dries, wherein this gas is guided through a cooler or otherwise cooled.

5. The device according to claim 4, wherein the gas that is used for the regeneration of the aforementioned at least one vessel that is regenerated, is then driven via a booster blower before being guided to the cooler if applicable, and then driven to the at least one vessel that dries.

6. The device according to claim 3, wherein the gas that is used for the regeneration of the aforementioned at least one vessel that is regenerated, is vented out afterwards.

7. The device according to claim 3, wherein to cool the aforementioned one vessel that is cooled, use is made of a proportion of the gas to be dried that is tapped off after the gas is driven via any cooler, whereby this tapped-off gas is then guided to the outlet for dried compressed gas.

8. The device according to claim 1, wherein there are six vessels, of which one vessel is always being cooled, two vessels are always being regenerated and three vessels are always used for drying or that there are eight vessels, of which one vessel is always being cooled, at least two vessels are always being regenerated and at least four vessels are always used for drying.

9. The device according to claim 1, wherein the vessels are formed by extruded profiles.

10. The device according to claim 3, wherein the aforementioned controllable valve system is constructed in the form of one or more blocks consisting of a network of pipes with valves or shutoff valves that are connected to the vessels.

11. A compressor installation provided with a compressor with an inlet for gas to be compressed and an outlet with a pressure pipe for compressed gas, wherein the compressor installation is provided with a device according to claim 1 for drying the flow of compressed gas supplied by the compressor that is guided through the device for the supply of dried gas to a consumer network via the outlet of the device, whereby to this end the pressure pipe connects to the inlet of the device.

12. A method for drying a compressed gas by a device with an inlet for compressed gas to be dried originating from a compressor and an outlet for dried compressor gas, wherein said device comprises at least four vessels that are filled with a regeneratable drying agent, and a controllable valve system that connects the inlet and outlet to the at least four vessels, the method comprises the steps of:
   controlling the valve system such that at least one vessel is always being regenerated, while at least two vessels dry the compressed gas, wherein the vessels are each successively regenerated in turn,
   splitting off and heating a portion of the dried compressor gas for the regeneration of the at least one vessel that is regenerated, and
   cooling the vessels before or after they are regenerated, wherein the valve system is controlled such that one vessel is always cooled, while the at least one vessel is regenerated and the at least two other vessels dry the compressed gas.

13. The method according to claim 12, wherein the method comprises the step of cooling the compressed gas originating from the compressor before driving it to the vessels that dry.

14. A method for drying a compressed gas by a device with an inlet for compressed gas to be dried originating from a compressor and an outlet for dried compressor gas, wherein said device comprises at least three vessels that are filled with a regeneratable drying agent, and a controllable valve system that connects the inlet and outlet to the at least four vessels, the method comprising the steps of:

controlling the valve system such that at least one first vessel is always being regenerated, while least one second vessel dries the compressed gas, and at least one third vessel is always cooled, wherein the vessels are each successively regenerated in turn, tapping off at least a portion of the compressed gas to be dried originating from the compressor before the gas is cooled for the regeneration of the at least one first vessel that is regenerated, and cooling the vessels before or after they are regenerated, wherein the valve system is controlled such that the at least one first vessel is always cooled, while the at least one second vessel is regenerated and the at least one third vessel dries the compressed gas.

15. The method according to claim 14, wherein the method comprises the step of driving the gas that is used for the regeneration of the aforementioned at least one first vessel that is regenerated, to the at least one vessel that dries, and optionally cooling it first.

16. The method according to claim 15, wherein the method comprises the step of driving the gas that is used for the regeneration of the aforementioned at least one first vessel that is regenerated, via a booster blower before optionally cooling it and then driving it to the vessels that dry.

* * * * *